United States Patent
Gibbs et al.

(10) Patent No.: US 6,549,523 B1
(45) Date of Patent: Apr. 15, 2003

(54) BACKGROUND NOISE CONTRAST REDUCTION FOR HANDOVERS INVOLVING A CHANGE OF SPEECH CODEC

(75) Inventors: Jonathan Alistair Gibbs, Southampton (GB); David Pearce, Harrow (GB); Dominic Chan, Kowloon (HK); Andrew John Aftelak, Newbury (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/462,048
(22) PCT Filed: Oct. 12, 1998
(86) PCT No.: PCT/EP98/06645
§ 371 (c)(1),
(2), (4) Date: Dec. 30, 1999
(87) PCT Pub. No.: WO99/21167
PCT Pub. Date: Apr. 29, 1999

(30) Foreign Application Priority Data

Oct. 16, 1997 (GB) ................................................ 9721885

(51) Int. Cl.⁷ .......................... H04Q 7/00; H04B 1/38; H04M 1/00
(52) U.S. Cl. ...................... 370/331; 455/553; 455/436
(58) Field of Search ................................ 455/436, 437, 455/552, 553; 370/331, 332, 333; 704/226

(56) References Cited

U.S. PATENT DOCUMENTS 6,278,877 B1 * 8/2001 Brederveld et al. ......... 455/434

* cited by examiner

Primary Examiner—Nguyen T. Vo

(57) ABSTRACT

A method and apparatus for smooth transitions of background noise as a mobile communication unit roams from a first communication system having a first speech encoder (310) to a second communication system having a second speech encoder (330). As the mobile communication unit roams into the second communication system, the first communication system will transfer the communication signal to the second communication system. Background noise from the first communication system is sampled (320), and as the communication signal is transferred, the noise signal sampled in the first communication system is mixed in a mixer of the second communication system with background noise sampled (340) from the second communication system. As the change in noise progresses, the noise from the first communication system will gradually be decreased and faded out while the noise from the second communication system will be gradually increased to a high power level.

9 Claims, 2 Drawing Sheets

BACKGROUND NOISE CONTRAST REDUCTION FOR HANDOVERS INVOLVING A CHANGE OF SPEECH CODEC

FIELD OF THE INVENTION

The present invention relates generally to quality of speech in a communication system, and in particular to reduction of noise contrast in a speech codec handover.

BACKGROUND OF THE INVENTION

Many speech codecs provide the ability for speech to be conveyed with toll quality. However, different codec technologies behave differently for the coding of non-speech signals, and in particular, background noise. For example, ADPCM at 32 kb/s (killobits per second), which has developed widespread use as a speech codec for digital cordless and short range systems (such as CT2, DECT, PHS and PACS systems), offers almost transparent quality for any background noise. Liner Prediction Analysis by Synthesis (LPAS) codecs (such as CELP, VSELP, and ACELP systems) which are predominantly used in cellular and digital PMR systems (such as GSM, IS-54, IS-95, iDEN, and TETRA) code background noise with a completely different character.

Mobile systems generally have background noise in transmissions although noise reduction is possible. Mobile systems include the background noise since it is well known that most users prefer some low level of comfort noise to be present to indicate that the call is still active.

Some systems, such as UMTS (Universal Mobile Telephone System), allow handovers between cordless/short range type environments and traditional cellular environments and from cellular to cordless/short range. The UMTS system is designed to allow a user to move about world-wide with a single mobile telephone unit and be able to communicate in any system in that area. The UMTS system also allows links different systems in a single area, such as cordless and cellular. In this type of system, a user may begin a call on their cordless system and then begin moving out of range of that system. In order to maintain the call, the call is handed over from one system to the other, such as from a cordless system to a cellular system. The call may also move from the cellular system to a cordless system as the user moves into the range of the cordless area.

As mentioned above, each speech encoder, or codec, has somewhat differing parameters and design requirements. Because of this, a user will hear different background noises as they use different communication systems incorporating different codecs. Certainly during a handover, where two different systems having differing design parameters are incorporated, the user will be exposed to differing codecs and therefore differing background noise.

In a system where more than one codec is utilized, such as the UMTS system mentioned above, it is desirable for users under handover conditions to be relatively unaware of the changes between background noise characteristics. UMTS aims to provide seamless handovers, and while seamless usually means without break, obvious background noise contrasts will occur during handovers between systems exploiting the different codec technologies.

DETAILED DESCRIPTION OF A PREFERRED EMBODIMENT

Figure 1:
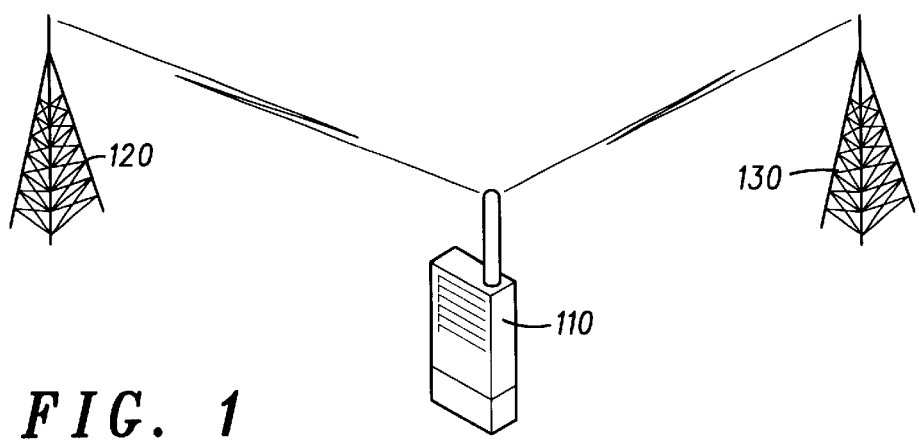
FIG. 1 is a diagram of a mobile unit in a handover condition.

The present invention provides a method and apparatus to allow smooth transitions of background noise as a mobile communication unit 110 (of FIG. 1) roams from a first communication system 120 having a first speech encoder (codec) to a second communication system 130 having a second speech encoder. As the mobile communication unit 110 roams into the second communication system 130, the first communication system 120 will transfer the communication signal to the second communication system 130, which transfer is called a handover. A voice activity detection system which is well known in the art is applied to the speech in order to discriminate between the times where speech and background noise are present and times when only background noise is present. During the background noise-only periods, background noise from the first communication system 120 is sampled, and as the communication signal is transferred, the noise signal sampled in the first communication system 120 is mixed in a mixer of the second communication system 130 with background noise sampled from the second codec. Initially, the noise from the first communication system 120 will have a high relative power level and the noise from the second communication system 130 will have a low relative power level. As the handover progresses, the noise from the first communication system 120 (initial noise) will gradually be decreased and faded out while the noise from the second communication system 130 will be gradually increased to a high relative power level. The result of the gradual transition from the noise of the first communication system 120 to the noise of the second communication system 130 is that the user of the mobile communication unit does not notice a change in the noise level from one system to the other.

Figure 2:
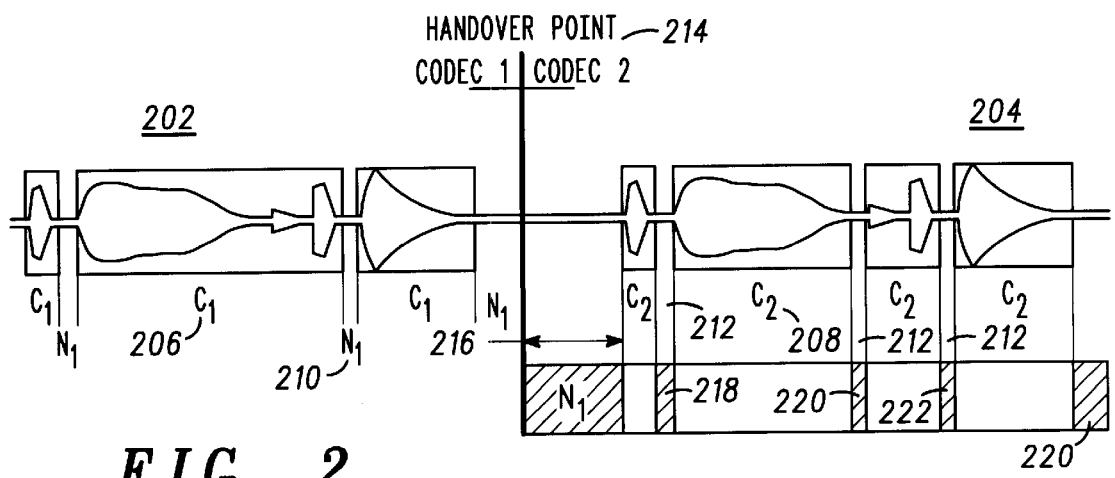
FIG. 2 is a diagram of a speech signal during a handover according to a preferred embodiment of the present invention.

Referring now to FIG. 2, signal patterns 202 and 204 of a first codec and a second codec, respectively, are shown. The element "C1" (206) of signal pattern 202 indicates active speech segments as coded by codec 1. The element "C2" (208) of signal pattern 204 indicates speech segments coded by codec 2. Element "N1" (210) of speech segment 202 represents "silent" periods between the speech segments 206, and element "N2" (212) of speech segment represents "silent" periods between the speech segments 208.

At the handover point (214), where the communication signal is transferred from codec 1 to codec 2, codec 2 will have a different noise level than that of N1 (210). If the noise of codec 2 were immediately inserted into silent periods N2 (212), a user would probably notice the difference in background noise. Accordingly, in the preferred embodiment of the present invention shown in FIG. 2, the sampled background noise from codec 1 is inserted into any initial silence period (216) occurring near the handover point. For instance, silence period 216 is simply N1. As the change from noise N1 to N2 continues to progress, noise N2 from codec 2 has been sampled during silence period 216 and is mixed with noise N1 to form a combined background noise level in silence period 218. Initially the level of noise N2 is low while the noise N1 is high. In silence period 220, noise N2 is increased further while noise N1 is decreased proportionally. Noise N2 in silence period 222 is increased still further and N1 is decreased further. With each silence period (218 through 224), the noise level of the two sampled noise N1 and N2 are changed with N1 decreasing while N2 increases until such point where only N2 noise remains.

Figure 3:
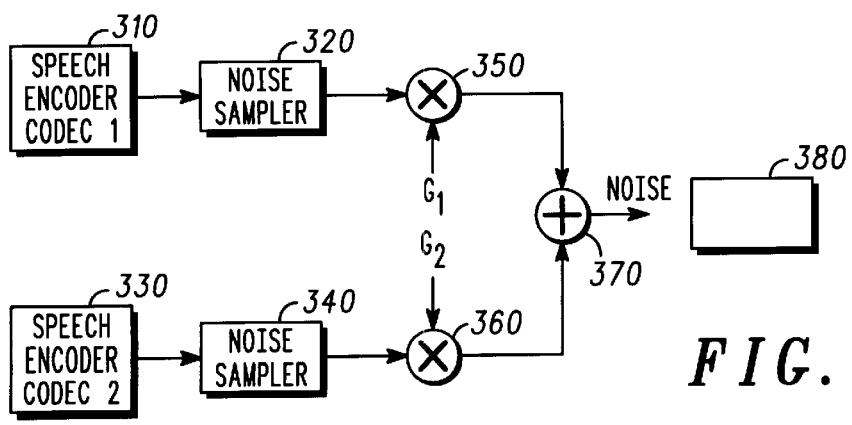
FIG. 3 is a diagram of elements used in the preferred embodiment of the present invention.

FIG. 3 shows a diagram of elements used in the present invention. Specifically, a first transceiver having codec 310 is transmitting the initial communication signal with the initial background noise. During the handover, noise sampler 320 samples the background noise from the communication signal received from codec 310. At the same time during the handover, a second transceiver having codec 330 is communicating with the mobile unit. The background noise from codec 330 is sampled in noise sampler 340. The background noise from both noise sampler 320 and noise sampler 340 are each supplied with a determined amount of gain G1 and G2 respectively in multipliers 350 and 360 respectively. The two noise streams are then combined in adder 370 to give the combined noise which is received by the mobile unit transceiver 380.

To gradually decrease the background noise from noise sampler 320 and increase the background noise from noise sampler 340, the gain for G1 and for G2 is determined in the following manner. The gains G1 and G2 are calculated at time "t", from the power interpolation function r(t). It is noted that the power interpolation function is well known in the art and will not be discussed in detail. The power interpolation function may be done linearly or by any appropriate monotonic function.

Assuming a nomenclature of p1 for the power of the background noise of codec 1 and p2 for the power of the background noise of codec 2, the power of the combined background noise (pT) at time t is:

$$pT = p1 * r(t) + p2(1-r(t)).$$

The initial estimates of G1 and G2 are then given by:

$$G1 = Sq.\ Rt.(r(t))$$

$$G2 = Sq.\ Rt.(1-r(t))$$

The gains G1 and G2 are then applied to the two noise sources as shown in FIG. 3. The total noise power is calculated and G1 and G2 are adjusted by a common multiplier in order to ensure that the total output power is equal to pT. Change in the power interpolation function through the noise change adjusts the values of G1 and G2 causing G1 to gradually go to zero as G2 gradually increases. Throughout the change with G1 and G2 adjusting according to the changing power interpolation function, the value of pT must remain a constant.

Figure 4:
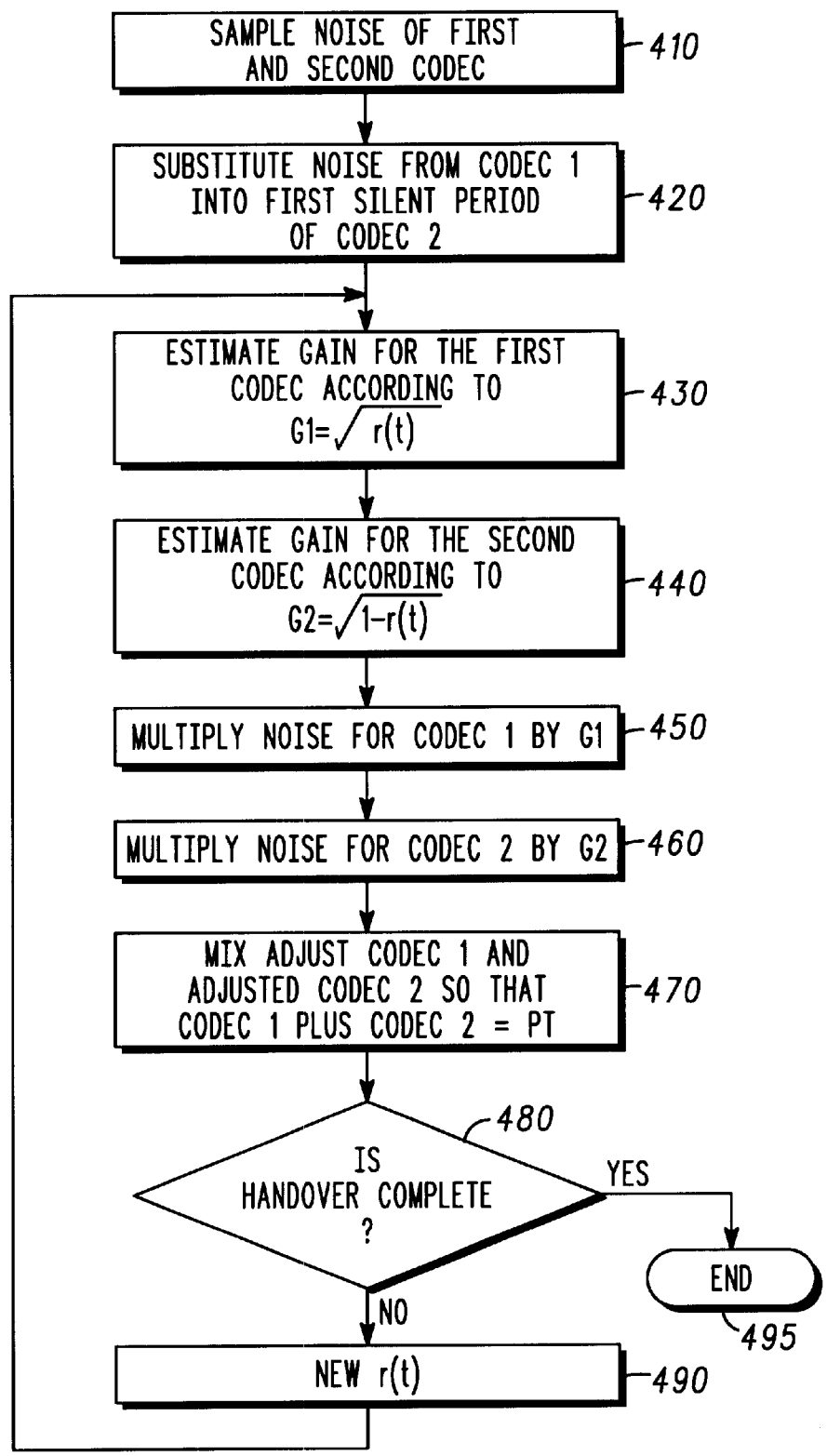
FIG. 4 is a flow chart of the method used by the preferred embodiment of the present invention.

FIG. 4 describes the process followed by the preferred embodiment of the present invention. Background noise is sampled from each of codec 1 and codec 2 (410). The background noise from codec 1 is substituted into the first silent period of codec 2 (216) (at step 420). The initial gain for the codec 1 noise during handover is estimated according to equation 2 above (430). The initial gain for codec 2 noise at handover is estimated according to equation 3 above (440). The noise for each is multiplied by their respective gains (450 and 460) and the adjusted noise levels are mixed (470). As mentioned above, the total output power must be equal to pT calculated at handover. If the change of the noise is not finished, a new r(t) is calculated (490) and new values of gain determined (430 and 440). The process of adjusting the levels of the background noise for codec 1 and codec 2 by adjusting gain continues until the change is completed (all noise N1 has been phased out leaving only noise N2) at which time the process ends (495).

By using the method and apparatus taught in the preferred embodiment of the present invention, a smooth transition from the background noise of a first communication system using a first speech encoder to a second communication system using a different speech encoder is facilitated. The gradual change from one background noise to another means the user will not be able to notice the handover because of differing noise levels. The present invention can be used in any system where differing speech encoders are incorporated.

What is claimed is:

1. A method comprising the steps of:

sampling a period of noise for each of a first and second speech encoder wherein a communication is transferred from the first speech encoder to the second speech encoder; and mixing the sampled period of noise of the first and second speech encoders for the communication transfer.

2. A method according to claim 1 wherein the step of mixing the sampled period comprises mixing the sampled period of noise from the second speech encoder from an initial low relative power level to a higher relative power level.

3. A method according to claim 2 wherein the step of mixing comprises estimating a gain of the sampled period of noise from the first speech encoder according to the equation square root of a power interpolation function.

4. A method according to claim 3 wherein the step of mixing comprises estimating a gain of the sampled period of noise from the second speech encoder according to the equation square root of one minus the power interpolation function.

5. A method according to claim 1 wherein the step of mixing the sampled period comprises mixing the sampled period of noise from the first speech encoder from an initial high power level to a zero power level.

6. A communication system comprising:

a first and second speech encoder, each of the speech encoders having differing background noise; and a mixer receiving samples of the background noise of the first speech encoder and mixing the background noise of the first speech encoder with the background noise of the second speech encoder for a communication transfer between the first and second speech encoders.

7. A communication system according to claim 6 wherein the mixer mixes the background noise from the first and second speech encoders in varying degrees to gradually increase a power level of the background noise of the second speech encoder and gradually decrease the background noise of the first speech encoder.

8. A transceiver comprising:

noise sampler which samples noise in a signal transmission of a first speech encoder of the transceiver; and mixer receiving the noise from the noise sampler and also receiving sampled noise from a signal transmission from a second speech encoder, the mixer combining the noise from the first and second speech encoders for a handover of the signal transmission from one of the first and second speech encoders to another of the first and second speech encoders.

9. A transceiver according to claim 8 wherein the mixer comprises a means for gradually fading out an initial sampled noise of the first speech encoder.

* * * * *